Sept. 8, 1931.  L. J. WINCHELL  1,822,329
PORTABLE SAW AND POWER ATTACHMENT
Filed March 23, 1929  2 Sheets-Sheet 1
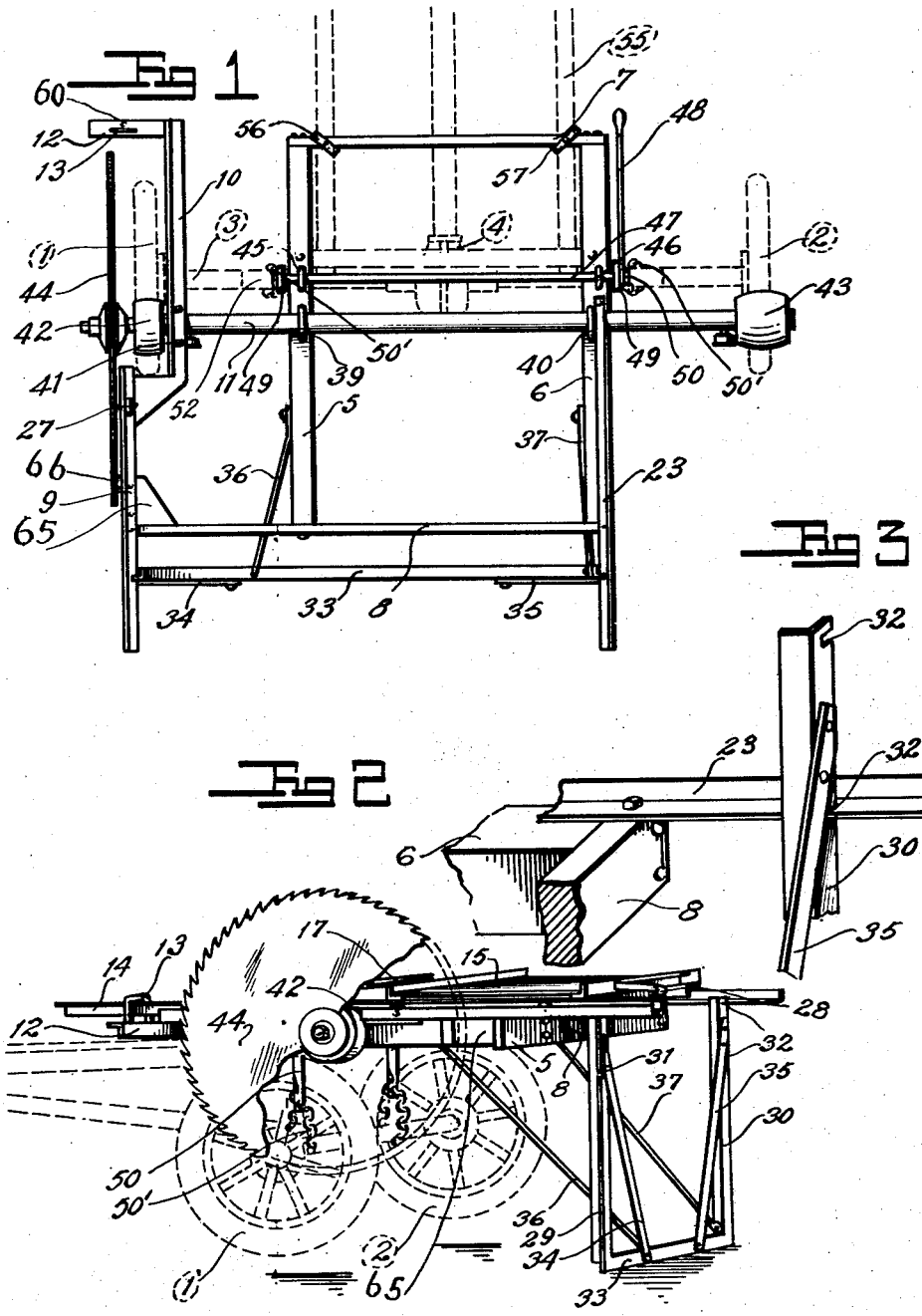
INVENTOR
Laurence J. Winchell
BY
B. F. Funk ATTORNEY

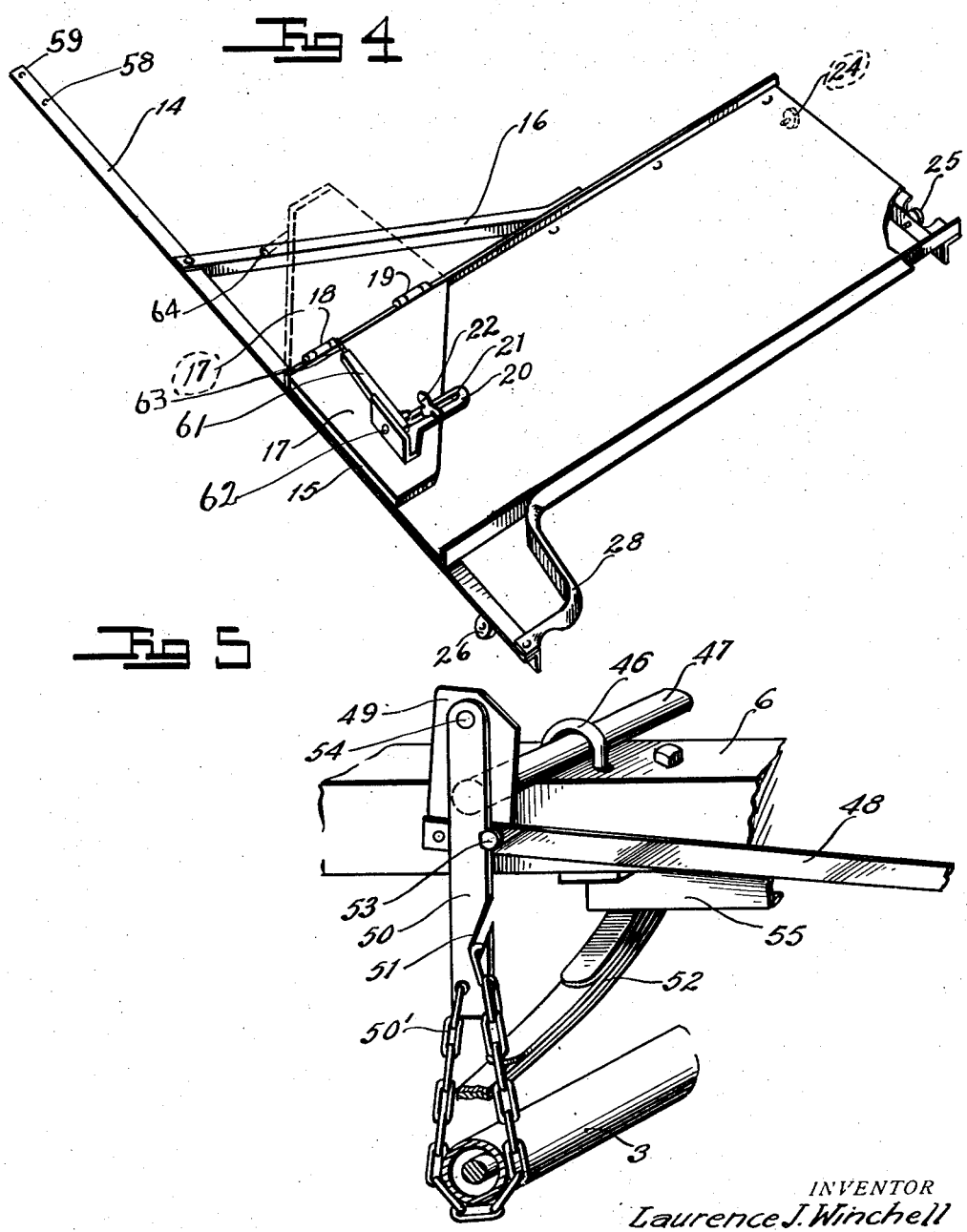

Patented Sept. 8, 1931

1,822,329

UNITED STATES PATENT OFFICE

LAURENCE J. WINCHELL, OF NEWKIRK, OKLAHOMA, ASSIGNOR OF ONE-FOURTH TO IRA D. MOLLETT, OF MANHATTAN, KANSAS

PORTABLE SAW AND POWER ATTACHMENT

Application filed March 23, 1929. Serial No. 349,336.

This invention relates to saw attachments for motor vehicles. The primary object of the invention is to provide a power saw which may take its motion from a moving part of the motor vehicle, preferably the drive wheels of the vehicle and the invention consists in certain parts and combination of parts all of which will be specifically described hereinafter, reference being had to the accompanying drawings in which:

Fig. 1 is a plan view of the saw power plant frame.

Fig. 2 is a rear perspective view of the saw mechanism, the saw being partially broken away.

Fig. 3 is a fragmentary perspective view of the motor vehicle supporting means.

Fig. 4 is a perspective view of the saw carriage and

Fig. 5 is a fragmentary perspective view of the spring compressing mechanism to raise the rear wheels of the motor vehicle off the ground.

The rear end of the motor vehicle is shown in dotted lines. The rear wheels 1 and 2 are driven through an axle through the differential 4 in the usual way. The sawing mechanism is shown as comprising a substantially rectangular frame consisting of the side bars 5 and 6, the front bar 7 and the rear bar 8. The rear bar 8 extends to one side of the main frame and is fastened to a guiding angle 9, carrying at its forward end a bracket 10 in which the saw and power shaft housing 11 is journaled. The bracket 10 has at its forward end a transverse projection 12 with a guide loop 13 to receive the guide bar 14 on the rectangular carriage 15 which carries a diagonal brace 16 fastened to the carriage frame and to the guide bar as shown in Figure 4. The carriage 15 carries a hinged guard 17 fastened to the forward end of the carriage by hinges 18 and 19, the guard being provided with a gage 20 laterally adjustable on the guard through the medium of a slotted extension 21 on the gage and a wing nut 22. The rail 6 carries an angle guide rail 23 parallel with the guide rail 9. The carriage carries two rollers 24 and 25 at one end which ride on the angle 23, and the opposite end of the carriage carries a roller 26 which rides on the angle 9 and the angle 9 is provided with a roller 27 upon which the carriage rests so that the carriage may move forwardly and rearwardly of the main frame.

The carriage is manually operated through the medium of the handle 28 at one end thereof (see Fig. 4). A vertical standard or supporting member is provided for the main frame which consists of the two uprights 29 and 30 having notches 31 and 32 to engage the edges of the angles 9 and 23 to act as a standard or brace. The uprights 29 and 30 are connected at their lower ends by a cross piece 33 which braces the uprights 29 and 30 through the diagonals 34 and 35. Forwardly extending pivoted braces 36 and 37 are connected to the vertical supporting frame and to the main frame of the saw attachment. The uprights 29 and 30 normally lie upon the main frame but they can be swung outwardly beyond the ends of the rails 9 and 23 and one of the notches in each upright 29 and 30 can be engaged by the lateral flanges of the angles 9 and 23 to form a vertical support for the saw attachment. Then, if the wheels 1 and 2 are lifted off the ground, the power can be taken from the motor vehicle to operate the saw.

By reference to Figure 1, it will be observed that the drive shaft housing 11 is fastened by U-bolts 39 and 40 on the rails or bars 5 and 6 and fastened to bracket 10 by U-bolt 41. The shaft carries two pulleys 42 and 43 which are in line with the wheels 1 and 2. Therefore, as the wheels 1 and 2 are brought into frictional contact with the pulleys 42 and 43, the shaft 11 will be driven and the circular saw 44 on the end of shaft 11 will be rotated.

In order to bring the wheels 1 and 2 into frictional engagement with the pulleys 42 and 43, I have provided an ingenious mechanism illustrated as consisting of the following elements. In bearings 45 and 46, on bars 5 and 6, is a transverse shaft 47 adapted to be rocked through the medium of a hand lever 48 at one end of the shaft. At each end of the shaft 47 is a crank plate 49 carrying a link 50 pivoted to the plate eccentrically to the axle of the shaft 47. The link carries a hook 51 to which is fastened one end of a chain 50', one link of which may engage over the hook. The chain in each instance can be passed around the axle housing 3, so by rocking the shaft, the axle will be raised toward the chassis frame of the motor vehicle compressing the springs 52 to raise the wheels off the ground and bring them into contact with the pulleys 42 and 43. As the uprights 29 and 30 support the rear end of the motor vehicle during this time and the front wheels support the front of the motor vehicle, it will be obvious that the saw 44 will be driven. The carriage may be slid forward and backward on the main saw frame supported by the rollers 24, 25, 26 and 27. The lever 48 is shown in Figure 5 as fastened to the crank plate 49 and it has a detent or pin 53 constituting a stop lug which is adapted to bear against the edge of the link 50 when the pivot pin 54, connecting link 50 to plate 49, is in raised position to compress the springs. When the lever 48 is thrown up into the vertical position, the plate 49 will be swung over to horizontal position lowering the pivot pin 54 and thereby lowering the link 50 to slack off the chain 50' with respect to the axle housing 3 to take the compression off the spring 52. Then the support consisting of the standards 29 and 30 and their appurtenances can be slid out of engagement with the channels 9 and 23 and then slid up horizontally to rest on the channels during transportation.

The guard 17 can be swung up to a vertical position for cross cutting or it may be swung down to the position shown in Figure 4 for ripping if desired. The board used to receive the ripping work is placed under the guard 17 and caused to project out in front of the saw. The table is prevented from rolling forward by dropping a pin in the extra hole in table guide 14 back of guide in block. The board to be ripped is then slid over the first board and the table using guide 20, Fig. 4, to gauge width of strip. The saw attachment may be fastened to the chassis frame 55 of the motor vehicle in any appropriate manner, as for example, by the fastening devices 56 and 57.

While I have described in detail what appears to me to be the best form of my invention, I would have it understood that I do not wish to be limited to the exact details of construction shown as changes in form, proportion and minor details of construction may be resorted to without departing from the spirit of the invention or sacrificing any of its advantages.

By reference to Figure 4 it will be observed that the guide bar 14 is provided near its free end with openings 58 and 59 adapted to receive pins to hold the carriage against movement, the pins being receivable in the opening 60 in member 12. When the hinged guard 17 is in the position shown in Figure 4, a board may be laid across the carriage to project slightly beyond the end of the carriage to receive the work for ripping. When it is desired to use the guard 17 for cross cutting it is held in a vertical position. This brace is pivoted to the member 20 by a rivet or lug 62 as indicated in Figure 4. The brace 61 has a pin 63 which is adapted to engage in an opening 64 in the member 16 (see Figure 4).

By reference to Figure 1 it will be observed that a block 65 is carried by the frame having a projecting portion 66 which extends towards the saw 44 so as to act as a guard to maintain substantial parallelism between the saw and the member 9. Under certain conditions I may find it desirable to drive other mechanism from the pulley 43 on the shaft 11. In that event, I may remove the saw 44 merely as a precautionary measure and place a belt on pulley 43 which in turn may drive a similar pulley on the mechanism to be driven, for example, a feed grinder or the like.

What I claim and desire to secure by Letters-Patent is:—

1. A saw attachment for motor vehicles comprising a frame adapted to be secured to a motor vehicle, a longitudinally sliding carriage carried by the frame, a movable prop for supporting the frame above the ground with the rear wheels of the motor vehicle raised free from the ground, a power shaft carried by the frame, a saw on one end of the power shaft, pulleys on the power shaft to aline with the rear wheels of the motor vehicle, a second shaft mounted on the frame, eccentrics carried by the ends of the second shaft, hook-shaped members supported by the eccentrics and means carried by the hook-shaped members for engaging the rear axle of the motor vehicle so that when the second shaft is rotated in one direction, the rear axle of the motor vehicle will be moved toward the frame to bring the rear wheels into contact with the pulleys on the power shaft.

2. A saw attachment for motor vehicles comprising a frame adapted to be secured to a motor vehicle, a power shaft on the frame, a saw carried by the power shaft, friction pulleys on the power shaft, a rock shaft carried by the frame, crank plates carried by the ends of the rock shaft, links carried by the crank plates and axle engaging means carried by the links, the rock shaft being effective when turned in one direction to raise the rear axle of the motor vehicle to contact the rear wheels of the motor vehicle with the pulleys.

In testimony whereof I affix my signature.

LAURENCE J. WINCHELL.